United States Patent Office 3,626,600
Patented Dec. 14, 1971

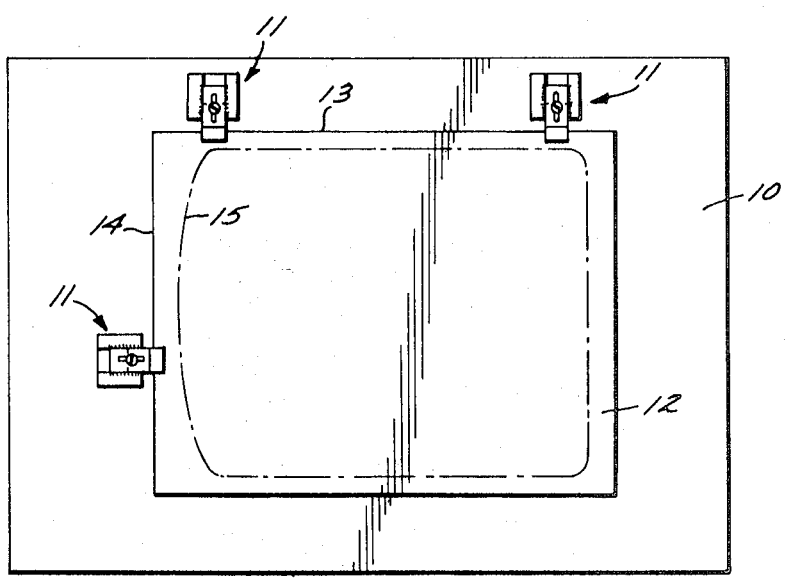
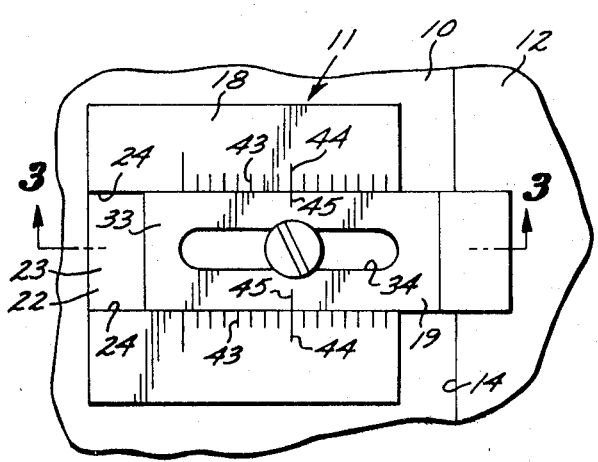
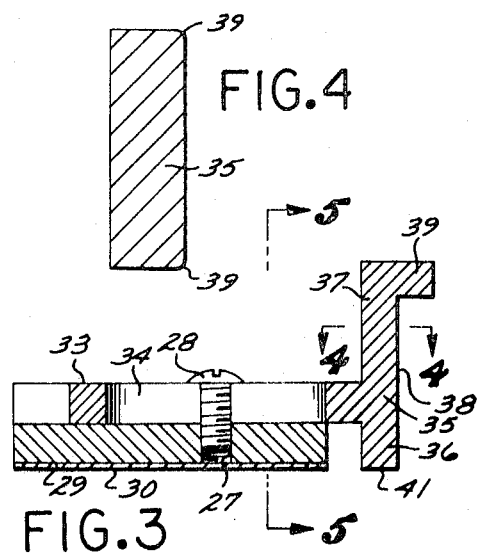
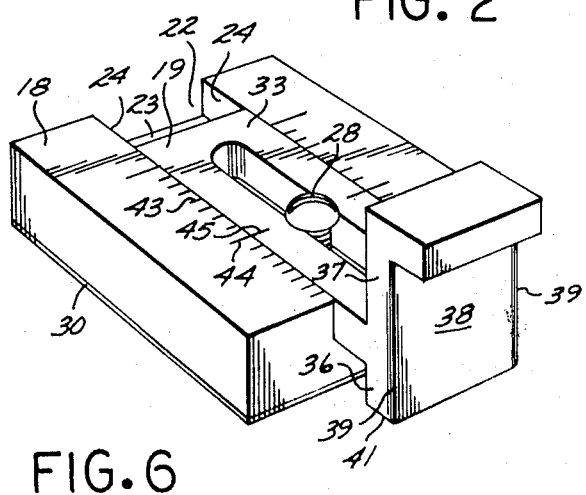
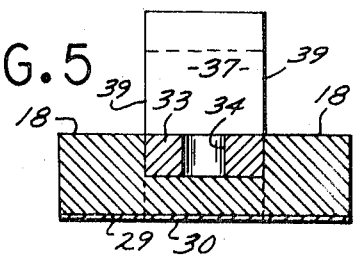

3,626,600
ADJUSTABLE INDEX DEVICE AND METHOD OF INDEXING ON A PLATEN SHEET STOCK
Donald D. Gaither, 14915 Barnwall St.,
La Mirada, Calif. 90638
Filed May 8, 1968, Ser. No. 734,836
Int. Cl. G01b 3/38
U.S. Cl. 33—180
4 Claims

ABSTRACT OF THE DISCLOSURE

An adjustable index device which includes a base member having a stop member movably connected to the base member for limited movement, said stop member having a horizontal flange received in a shallow groove across the top of the base member so as to be limited to lineal movement, and also having an abutment portion with a depending section depending to a position even with the bottom of the base and an upstanding portion provided with a lip so as to be adapted to engage and index the edge of sheet stock; said device having means for selectively locking said stop member against movement relative to said base member. Said disclosure also discloses a method of indexing sheet stock on a press platen using a plurality of index devices of the type just described, wherein the index device, with the stop member locked at approximately the mid-point of its movement relative to the base member, is secured to the platen; and then a test cut is made on sheet stock, and then the amount that the stop member must be moved in order to obtain proper positioning of the edge of the sheet stock is determined; and then the stop member is unlocked, adjusted to the desired proper position, and then relocked against movement relative to the base member.

---

This invention relates to an adjustable index device particularly adapted for accurately indexing sheet stock on a platen of a press, and the method of indexing sheet stock using such an index device.

Embodiments of the present invention, and the present inventive method are used in accurately positioning sheet stock on a press platen—which sheet stock is indexed by being urged against, for example, three index devices secured to the platen. After such sheet stock is accurately positioned, the sheet stock is operated upon by items such as steel rule cutting dies for the proper shaping or forming. Prior to the present invention, however, substantial time has been lost in the process of accurately setting up the index devices at the accurate positions desired in order to accomplish the accurate positioning of the sheet stock by forcing the sheet stock against the index devices. In the past, it was necessary to secure the index devices to the platen at approximately the position desired. Then, a sheet of the sheet stock was placed on a platen against the index devices, and a test-cut was made to determine the accuracy of the positioning of the sheet. Then, the person would attempt to determine how much the various indexes had to be moved. At that time, he would have to remove from the platen a particular index device to be moved, and move it, and then resecure it to the platen. This is a very time consuming process as—quite often—a particular index device must be moved several times in order to get the desired positioning effect on the sheet stock.

Further, often, the index devices are adhered to the platen by means of cement. The operator is faced with the problem that he must use sufficient cement that—if the index stop were in the proper position, the index device would be sufficient anchored to the platen to perform its function through a large number of operations. Therefore, the operator must securely anchor the index device to the platen and then break the index device loose each time he wants to move it. This process is not only time consuming, but it shortens the life of the index device. In addition, there is the waste of the time necessary to eliminate any unwanted adhesive which remains on the platen after the index device is removed.

With embodiments of the present invention, and the method which can be accomplished through the embodiments of the present invention, these problems can be obviated.

With embodiments of the present invention, there is a base member having an adjustable stop member movably connected thereto for limited movement, and there is provided means for selectively locking stop member against that relative movement. With such index devices, the method of providing index means on a platen of a press for sheet stock can include the steps of: locking the stop member at approximately the mid-portion of its adjustment movement; adhering the base member to the platen with the abutment portion of the stop member at approximately the position that it is desired that the edge of a sheet of sheet stock be engaged; placing a piece of sheet stock against the index device and making a test cut; and then unlocking stop member against said movement relative to said base member the desired amount; and then relocking stop member against said movement.

In addition, the embodiments of the present invention have the particular feature that they can be manufactured very inexpensively. This is because of the unique construction which lends the base member and the stop member to being produced by an extrusion and punch process or being produced by a die cast process. As large numbers of index devices are used, such economical construction is an important aspect of the present invention.

With the foregoing in mind, it is a major object of this invention to provide an improved adjustable index device.

Another object of this invention is to provide an improved method for providing index means on the platen of a press for indexing sheet stock to be cut or operated upon.

A still further object of this invention is to provide an adjustable index device which may be inexpensively manufactured.

A still further object of this invention is to provide an adjustable index device including a base member and a stop member wherein there is provided on the device means for very accurately determining the distance that the stop member is selectively moved relative to the base member.

Other and further objects of this invention will become apparent in the detailed description below in conjunction with the attached drawings wherein:

FIG. 1 is a planned view of a platen having thereon three index devices embodying a preferred form of the present invention;

FIG. 2 is an enlarged fragmentary plan view of one of said preferred index devices shown in FIG. 1;

FIG. 3 is a cross sectional view of the index device shown in FIG. 2 taken along line 3—3 in FIG. 2;

FIG. 4 is an enlarged cross sectional view of the abutment portion of the index device taken along line 4—4 in FIG. 3;

FIG. 5 is a cross sectional view of said index device taken along line 5—5 in FIG. 3; and, FIG. 6 is a perspective view of said preferred index device.

Referring now to FIG. 1 of the drawings, there is shown a platen 10 having three adjustable index devices, indicated generally by the arrows 11, positioned to index a sheet 12 of sheet stock by engaging long edge 13 and short edge 14 of the sheet. By way of example, there is a cut line 15 on the sheet 12 to exemplify a cutting operation.

In practice, the side of the platen 10 having the two index devices 11 is lower than the opposite side where the operator will stand. Therefore, the operator can rapidly index each sheet 12 of stock each time the press opened by rapidly pushing the edge 13 of the sheet against the two index devices 11 and then sliding the sheet till the edge 14 is against the third index device.

Referring now to FIGS. 2 to 6, the preferred form of the index device 11 will be described in further detail.

The index device 11 preferably includes a base member 18 and a stop member 19 which is movably connected to the base member by a preferred means which will not be described. The base member 18 has a groove 22 formed across the center of its top and extending the length of the base member. As can be seen, the groove 22 extends approximately half way through the base member 18 and is defined by a flat bottom 23 and a pair of parallel vertical side walls 24. Approximately 30% of the way from the right edge (as seen in FIG. 2) of the base member 18, and on the center line of the groove 22, there is provided a vertical threaded hole 27 in the base member. This hole 27 removably receives a screw 28 for a purpose to be described.

As can best be seen in FIGS. 3 and 5, the base member is further defined by a flat bottom 29, which, preferably receives a face of adhesive 30 thereon for adhering the index device 11 to the platen 10. Preferably, the face of adhesive 30 is supplied by adhering to said bottom 29 a piece of tape having contact adhesive on both sides. When, through use, the holding power of the adhesive 30 becomes reduced, the tape is replaced.

Referring now to the stop member 19 in particular, it includes a horizontal flange 33 having an axial slot 34 extending vertically through the flange to receive the shank of the screw 28. It will be noted that the flange 33 has a width substantially equal to the distance between the side walls 24, and that the sides of the flange and the bottom of the flange are received in close sliding fit with the bottom 23 and the side walls 24 of the groove 22. Accordingly, the stop member 19 is limited to lineal movement between two extreme ends of movement as limited by the length of the slot 34 through which the screw 28 is received. It has been found that if the slot 34 is from ¾ to 1 inch long, there is sufficient flexibility in the index device to accomplish the advantages of the present invention.

At the right end of the flange 33 (as seen in FIG. 3) there is an abutment portion 35 having a depending section 36 and upstanding section 37 defining an abutment face 38 for engaging a respective edge 13 of a sheet 12 of stock. A laterally extending lip section 39 is located at the upper end of the upstanding section 37 in order to further insure that the stock does not slide off of the face 38.

Preferably, vertical corner edges 40 on either side of the abutment face 38 are rounded to facilitate sliding movement of an edge 13 or 14 of a sheet 12 of stock across said abutment face.

It is important that the depending section 36 allows the flange 33 to be positioned substantially above bottom surface 41 of the abutment portion 35. This permits the groove 22 to be formed in the top of the base member 18 leaving an essentially uninterrupted flat bottom 29 on the base member for purposes of adhering the base member to the platen. If the depending section 36 were not provided, the groove 22 would have to be provided at the bottom of the base member 18 with the obvious limitation of the surface available for adhesion purposes.

Located on the upper side of the base member 18 adjacent each side wall 24 is a series of equally spaced distance marks 43 equally spaced apart a distance of, e.g., ⅟₁₆ of an inch. The series of distance marks 43 extend parallel to the axis of the groove 22 and said distance marks are centered on the axis of the hole 27. Preferably, an enlarged center distance mark 44 is provided. At substantially mid-way the length of the slot 34 there is provided on the flange 33 an index mark 45 on either side of the slot. With this means, the stop member 19 can be quickly moved to the center of its range of adjustment movement by aligning the center distance mark 44 with the index mark 45. Although one set of distance marks 43 and 44, and index mark 45 can be used, the use of two sets is preferred in order to insure that one set will be easily visible regardless of the position of the device 11. The use of the distance marks 43 and 44 and the index mark 45 will be described in further detail below.

Before going into the method which can be accomplished with the use of embodiments of the present invention, there should be noted the device 11 facilitates very low cost manufacture. More particularly, the base member 18 may be produced by an extrusion process with the groove 24 being formed in a long bar. Then, by a cutting process the base member 18 can be made to the preferred length (this would be in the left and right direction in FIG. 2). Then, with the mere addition steps of drilling and tapping the hole 27 and providing the marks 43 and 44, the base member 18 is complete.

Along the same lines, the stop member 19 can be extruded in a long bar having a cross section like the cross section of the stop member 19, as seen in the aspect of FIG. 3. Then, the long bar can be rapidly cut into pieces each having a length only slightly less than the width of the groove 22 of the base member 18. At that point, the slot 34 is merely punched out, the corner edges 39 are rounded off, and the unit is complete.

The members 18 and 19 can be made of materials such as plastic. However, it is preferred that they be made out of aluminum which can be easily extruded and formed, and which will provide a device with a long life.

The particular structural features of the base and stop members 18 and 19 respectively also lend themselves to low cost production wherein the parts are completed by being die cast of aluminum and threading the hole 27.

And, index device such as indicated by the arrow 11 enables the operator to use the following method of providing index means on a platen of a press for indexing stock to be cut or shaped. Firstly, the operator can visually determine the approximate desired position of the sheet of stock. However, the greatest difficulty is getting the adjustment of the sheet to the last quarer of an inch. Accordingly, the operator will first loosen the screw 28 in order that he can position the stop member 19 to a point where the index mark 45 is aligned with the center distance mark 44, i.e., where the stop member 19 is approximately mid-way of its range of adjustment motion. At that time, he will lightly tighten the screw 28 in order to lock the stop member 19 against movement relative to the base member 18. He will then preferably through the use of a face of adhesive 30—adhere the bottom 29 of the base member 18 to the platen 10 at the position where the abutment face 38 of the abutment portion 35 is within approximately ¼ of an inch of what will have to be the final position in order to properly index the appropriate edge of the sheet stock. He can accomplish the positioning of the abutment portion 35 to this degree of accuracy without undue difficulty.

After this process is repeated for the other index devices desired, the operator can place a sheet of stock against the index devices and close the press. The steel rule dies (or other means which operate from the stock) will form an impression or cut the stock. If the stock has to be adjusted in one direction or another in order that the dies will be properly located, the operator can accurately measure on the sample—which is still on the platen—how far the stock must be adjusted and in what direction. It is then a simple matter to loosen the appropriate screw 28, and move the appropriate stop member 19 the desired distance in the desired direction. By way of example, if the distance marks 43 were spaced apart every ⅟₁₆ of an inch, and if it were desired to move the abutment face 38 ³⁄₁₆ of an inch (a distance which was determined by measuring directly on the test sheet of stock) the operator merely slides the stop member sufficiently to move two distance marks 43 past the index mark 45 and stop the stop member with the index mark 45 at the third distance mark 43. Then, the screw 28 is quickly tightened to lock the stop member 19 against movement relative to the base member 18.

After all of the index devices 11 have been adjusted as desired, another test cut is made. Then, if any further adjustment is needed or desired, the easy method of adjustment is repeated.

Although a few embodiment of the present invention have been shown and described in detail, it will be apparent to those skilled in the art that such is by way of illustration only, and numerous changes may be made thereto without departing from the spirit of the present invention. Accordingly, it is my intention that the invention be limited solely by the appended claims.

I claim:

1. The method of indexing on a platen of a press stock to be cut or shaped, said method including the steps of:
   positioning on the platen at a desired position an index device having a base member and an adjustable stop member, which can be adjusted a predetermined adjustment distance relative to said base member and has an abutment portion adapted to be engaged by the edge of stock to be cut or shaped;
   adhering the base member to the platen at a desired position;
   adjusting the stop member relative to the base member to place the abutment portion in the desired position;
   placing a sheet of stock on said platen against the abutment portion of said index device;
   closing said press on said sheet and opening said press; determining how much the abutment portion of that index device is away from its desired position to index the sheet of stock as desired;
   adjusting the stop member to place the abutment portion at the desired position;
   and securing the stop member against movement relative to the base member.

2. The method set forth in claim 1 wherein:
   said stop member is adjusted to a position approximately midway of said adjustment distance before said sheet of stock is placed on said platen.

3. In combination with a platen of a press which platen has a planar surface:
   an index device comprising:
   a base member, said base member having a flat bottom surface and a straight groove across its top surface parallel to the surface of said platen;
   a stop member, said stop member having a flange extending in said groove parallel to said surface of said platen and an abutment portion which extends toward said platen surface to a point even with the bottom of said base member and away from said platen surface a distance substantially beyond the top of said flange, said stop member being adjustable relative to said base member for a predetermined distance, said flange on said stop member being constrained by said groove for lineal movement;
   and lock means on said device for selectively locking said stop member against movement relative to said base member;
   and means on said base member bottom adhering said base member to said platen.

4. The combination set forth in claim 3 wherein said abutment portion has:
   an abutment face extending at a right angle to said platen surface and said groove;
   and a lip at a point substantially away from said platen, said lip extending beyond said abutment face, whereby any stock on the platen and engaging the abutment face will engage the lip if the stock moves away from the platen surface.

References Cited

UNITED STATES PATENTS

| | | | |
|---|---|---|---|
| 487,106 | 11/1892 | Wayland | 144—307 |
| 2,619,730 | 12/1952 | Carter | 33—189 |
| 2,704,890 | 3/1955 | Welsch | 33—169 A |
| 2,898,713 | 8/1959 | Jansson | 33—189 X |
| 3,188,078 | 6/1965 | Peterson | 33—174 X TA |
| 3,232,603 | 2/1966 | Gaither et al. | 269—315 |

FOREIGN PATENTS

| | | | |
|---|---|---|---|
| 344,556 | 3/1960 | Switzerland | 144—306 |

WILLIAM D. MARTIN, JR., Primary Examiner

U.S. Cl. X.R.

33—169, 174; 269—315